(12) United States Patent
Govindarao et al.

(10) Patent No.: US 9,275,134 B2
(45) Date of Patent: Mar. 1, 2016

(54) METHOD, APPARATUS AND COMPUTER PROGRAM PRODUCT FOR CLASSIFICATION OF OBJECTS

(71) Applicant: Nokia Technologies Oy, Espoo (FI)

(72) Inventors: Krishna Annasagar Govindarao, Bangalore (IN); Gururaj Gopal Putraya, Bangalore (IN)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 13/689,084

(22) Filed: Nov. 29, 2012

(65) Prior Publication Data

US 2013/0138657 A1 May 30, 2013

(30) Foreign Application Priority Data

Nov. 29, 2011 (IN) .............................. 4120/CHE/2011

(51) Int. Cl.
*G06F 17/30* (2006.01)
*G06K 9/62* (2006.01)
*G06K 9/00* (2006.01)

(52) U.S. Cl.
CPC ...... *G06F 17/30707* (2013.01); *G06F 17/3002* (2013.01); *G06K 9/00295* (2013.01); *G06K 9/627* (2013.01); *G06K 9/6215* (2013.01); *G06K 9/6232* (2013.01)

(58) Field of Classification Search
CPC ............................ G06F 17/3002; G06K 9/627
USPC ........................................................ 707/740
See application file for complete search history.

(56) References Cited

U.S. PATENT DOCUMENTS

| 2007/0133855 | A1 | 6/2007 | Kataoka |
| 2008/0175446 | A1 | 7/2008 | Kirby et al. |
| 2008/0195547 | A1* | 8/2008 | Boyer et al. .................... 705/59 |
| 2008/0205774 | A1 | 8/2008 | Brinker et al. |
| 2009/0006102 | A1* | 1/2009 | Kan et al. ...................... 704/500 |
| 2010/0329556 | A1 | 12/2010 | Mitarai et al. |

OTHER PUBLICATIONS

International Search Report/Written Opinion for Application No. PCT/FI2012/051026 dated Jan. 31, 2013.
Manning, C. D. et al., *Vector Space Classification*, Chapter 14, Introduction to Information Retrieval, Cambridge University Press, (2008) 289-317.

* cited by examiner

*Primary Examiner* — Grace Park
(74) *Attorney, Agent, or Firm* — Alston & Bird LLP (57) ABSTRACT

In accordance with various example embodiments, methods, apparatuses, and computer program products are provided. A method comprises accessing a gallery comprising a plurality of classes, determining distances between classes of the plurality of classes, and determining thresholds for one or more classes of the gallery for classifying test objects in the classes, wherein threshold for a class is determined based on at least one distance of the class from at least one remaining class of the plurality of classes. The apparatus comprises at least one processor and at least one memory, configured to, cause the apparatus to perform accessing a gallery comprising a plurality of classes, determining distances between classes of the plurality of classes, and determining thresholds for classes of the gallery for classifying test objects in the classes, wherein threshold for a class is determined based on distances of the class from remaining classes of the gallery.

20 Claims, 6 Drawing Sheets

METHOD, APPARATUS AND COMPUTER PROGRAM PRODUCT FOR CLASSIFICATION OF OBJECTS

CROSS-REFERENCE TO RELATED APPLICATION

This application claims priority to Indian Patent Application No. 4120/CHE/2011, filed on Nov. 29, 2011, the entire contents of which of hereby incorporated by reference.

TECHNICAL FIELD

Various implementations relate generally to method, apparatus, and computer program product for object recognition and classification.

BACKGROUND

Various electronic devices such as cameras, mobile phones, and other devices having capabilities for processing media content such as images, videos, animations. Some of the media content processing applications may include recognition and classification of objects captured or received by these devices. The objects are primarily classified in two ways, namely, closed set classification and open set classification. In the closed set recognition, objects are classified compulsorily in one of the already trained classes that are known classes. In open set classification, an object belonging to a class not known/trained, is classified as belonging to none of the trained classes. For example, in open set face recognition, there may be a gallery of trained faces, and if the face of a person that is to be classified is not present of the gallery, a device should correctly determine that the face does not belong to any class of the gallery.

SUMMARY OF SOME EMBODIMENTS

Various aspects of examples embodiments are set out in the claims.

In a first aspect, there is provided a method comprising: accessing a gallery comprising a plurality of classes; determining distances between classes of the plurality of classes; and determining thresholds for one or more classes of the gallery for classifying one or more test objects in the one or more classes, wherein threshold for a class is determined based at least in part on at least one distance of the class from at least one remaining class of the plurality of classes.

In a second aspect, there is provided an apparatus comprising: at least one processor; and at least one memory comprising computer program code, the at least one memory and the computer program code configured to, with the at least one processor, cause the apparatus at least to perform: accessing a gallery comprising a plurality of classes; determining distances between classes of the plurality of classes; and determining thresholds for one or more classes of the gallery for classifying one or more test objects in the one or more classes, wherein threshold for a class is determined based at least in part on at least one distance of the class from at least one remaining class of the plurality of classes.

In a third aspect, there is provided a computer program product comprising at least one computer-readable storage medium, the computer-readable storage medium comprising a set of instructions, which, when executed by one or more processors, cause an apparatus to at least perform: accessing a gallery comprising a plurality of classes; determining distances between classes of the plurality of classes; and determining thresholds for one or more classes of the gallery for classifying one or more test objects in the one or more classes, wherein threshold for a class is determined based at least in part on at least one distance of the class from at least one remaining class of the plurality of classes.

In a fourth aspect, there is provided an apparatus comprising: means for accessing a gallery comprising a plurality of classes; means for determining distances between classes of the plurality of classes; and means for determining thresholds for one or more classes of the gallery for classifying one or more test objects in the one or more classes, wherein threshold for a class is determined based at least in part on at least one distance of the class from at least one remaining class of the plurality of classes.

In a fifth aspect, there is provided a computer program comprising program instructions which when executed by an apparatus, cause the apparatus to: access a gallery comprising a plurality of classes; determine distances between classes of the plurality of classes; and determine thresholds for one or more classes of the gallery for classifying one or more test objects in the one or more classes, wherein threshold for a class is determined based at least in part on at least one distance of the class from at least one remaining class of the plurality of classes.

BRIEF DESCRIPTION OF THE FIGURES

Various embodiments are illustrated by way of example, and not by way of limitation, in the figures of the accompanying drawings in which.

DETAILED DESCRIPTION

Example embodiments and their potential effects are understood by referring to FIGS. 1 through 6 of the drawings.

Figure 1:
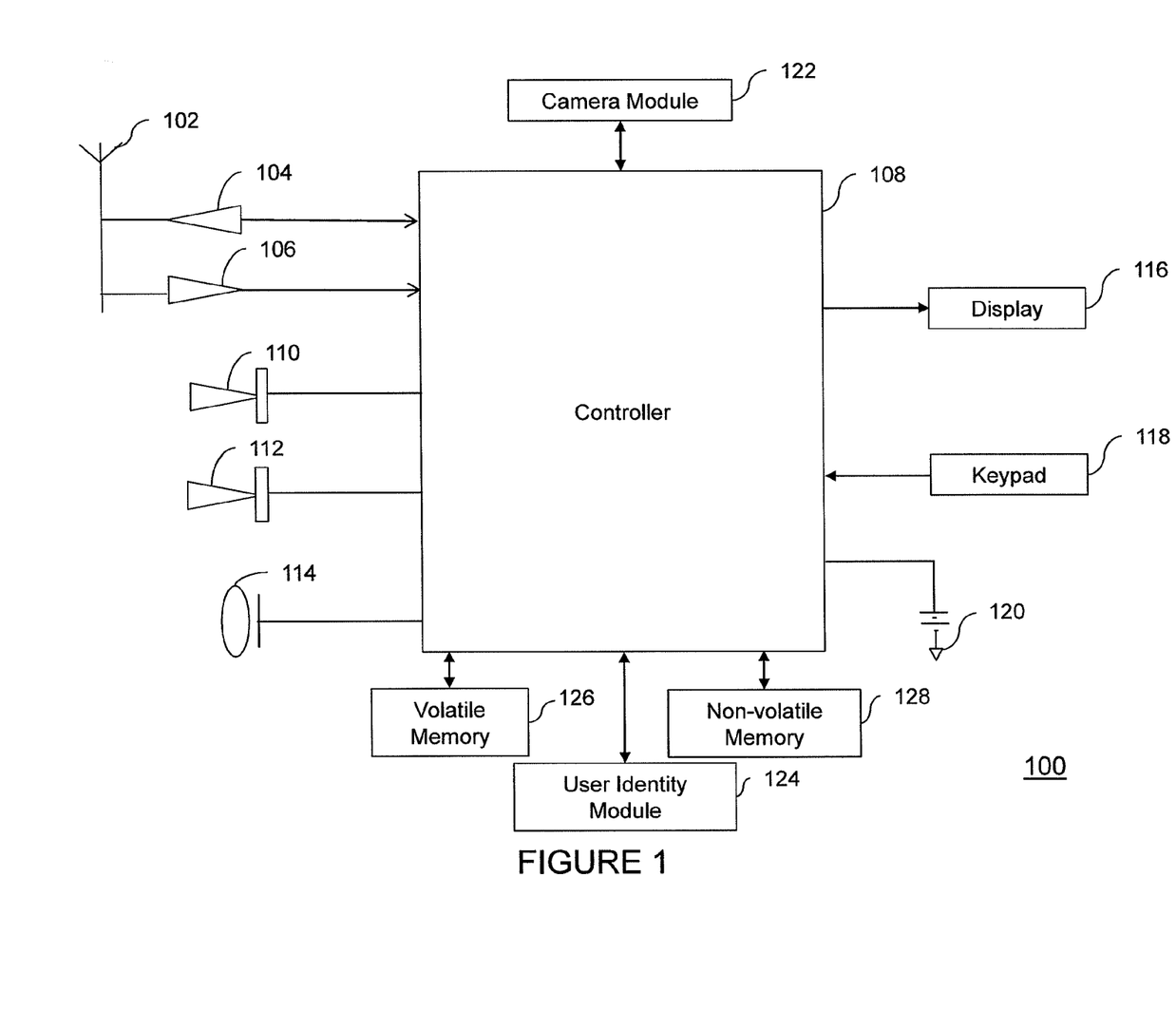
FIG. 1 illustrates a device in accordance with an example embodiment.

FIG. 1 illustrates a device 100 in accordance with an example embodiment. It should be understood, however, that the device 100 as illustrated and hereinafter described is merely illustrative of one type of device that may benefit from various embodiments, therefore, should not be taken to limit the scope of the embodiments. As such, it should be appreciated that at least some of the components described below in connection with the device 100 may be optional and thus in an example embodiment may include more, less or different components than those described in connection with the example embodiment of FIG. 1. The device 100 could be any of a number of types of mobile electronic devices, for example, portable digital assistants (PDAs), pagers, mobile televisions, gaming devices, cellular phones, all types of computers (for example, laptops, mobile computers or desktops), cameras, audio/video players, radios, global positioning system (GPS) devices, media players, mobile digital assistants, or any combination of the aforementioned, and other types of communications devices.

The device 100 may include an antenna 102 (or multiple antennas) in operable communication with a transmitter 104 and a receiver 106. The device 100 may further include an apparatus, such as a controller 108 or other processing device that provides signals to and receives signals from the transmitter 104 and receiver 106, respectively. The signals may include signaling information in accordance with the air interface standard of the applicable cellular system, and/or may also include data corresponding to user speech, received data and/or user generated data. In this regard, the device 100 may be capable of operating with one or more air interface standards, communication protocols, modulation types, and access types. By way of illustration, the device 100 may be capable of operating in accordance with any of a number of first, second, third and/or fourth-generation communication protocols or the like. For example, the device 100 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA1000, wideband CDMA (WCDMA) and time division-synchronous CDMA (TD-SCDMA), with 3.9G wireless communication protocol such as evolved-universal terrestrial radio access network (E-UTRAN), with fourth-generation (4G) wireless communication protocols, or the like. As an alternative (or additionally), the device 100 may be capable of operating in accordance with non-cellular communication mechanisms. For example, computer networks such as the Internet, local area network, wide area networks, and the like; short range wireless communication networks such as include Bluetooth® networks, Zigbee® networks, Institute of Electric and Electronic Engineers (IEEE) 802.11x networks, and the like; wireline telecommunication networks such as public switched telephone network (PSTN).

The controller 108 may include circuitry implementing, among others, audio and logic functions of the device 100. For example, the controller 108 may include, but are not limited to, one or more digital signal processor devices, one or more microprocessor devices, one or more processor(s) with accompanying digital signal processor(s), one or more processor(s) without accompanying digital signal processor(s), one or more special-purpose computer chips, one or more field-programmable gate arrays (FPGAs), one or more controllers, one or more application-specific integrated circuits (ASICs), one or more computer(s), various analog to digital converters, digital to analog converters, and/or other support circuits. Control and signal processing functions of the device 100 are allocated between these devices according to their respective capabilities. The controller 108 thus may also include the functionality to convolutionally encode and interleave message and data prior to modulation and transmission. The controller 108 may additionally include an internal voice coder, and may include an internal data modem. Further, the controller 108 may include functionality to operate one or more software programs, which may be stored in a memory. For example, the controller 108 may be capable of operating a connectivity program, such as a conventional Web browser. The connectivity program may then allow the device 100 to transmit and receive Web content, such as location-based content and/or other web page content, according to a Wireless Application Protocol (WAP), Hypertext Transfer Protocol (HTTP) and/or the like. In an example embodiment, the controller 108 may be embodied as a multi-core processor such as a dual or quad core processor. However, any number of processors may be included in the controller 108.

The device 100 may also comprise a user interface including an output device such as a ringer 110, an earphone or speaker 112, a microphone 114, a display 116, and a user input interface, which may be coupled to the controller 108. The user input interface, which allows the device 100 to receive data, may include any of a number of devices allowing the device 100 to receive data, such as a keypad 118, a touch display, a microphone or other input device. In embodiments including the keypad 118, the keypad 118 may include numeric (0-9) and related keys (#, *), and other hard and soft keys used for operating the device 100. Alternatively or additionally, the keypad 118 may include a conventional QWERTY keypad arrangement. The keypad 118 may also include various soft keys with associated functions. In addition, or alternatively, the device 100 may include an interface device such as a joystick or other user input interface. The device 100 further includes a battery 120, such as a vibrating battery pack, for powering various circuits that are used to operate the device 100, as well as optionally providing mechanical vibration as a detectable output.

In an example embodiment, the device 100 includes a media capturing element, such as a camera, video and/or audio module, in communication with the controller 108. The media capturing element may be any means for capturing an image, video and/or audio for storage, display or transmission. In an example embodiment in which the media capturing element is a camera module 122, the camera module 122 may include a digital camera capable of forming a digital image file from a captured image. As such, the camera module 122 includes all hardware, such as a lens or other optical component(s), and software for creating a digital image file from a captured image. Alternatively, the camera module 122 may include the hardware needed to view an image, while a memory device of the device 100 stores instructions for execution by the controller 108 in the form of software to create a digital image file from a captured image. In an example embodiment, the camera module 122 may further include a processing element such as a co-processor, which assists the controller 108 in processing image data and an encoder and/or decoder for compressing and/or decompressing image data. The encoder and/or decoder may encode and/or decode according to a JPEG standard format or another like format. For video, the encoder and/or decoder may employ any of a plurality of standard formats such as, for example, standards associated with H.261, H.262/MPEG-2, H.263, H.264, H.264/MPEG-4, MPEG-4, and the like. In some cases, the camera module 122 may provide live image data to the display 116. Moreover, in an example embodiment, the display 116 may be located on one side of the device 100 and the camera module 122 may include a lens positioned on the opposite side of the device 100 with respect to the display 116 to enable the camera module 122 to capture images on one side of the device 100 and present a view of such images to the user positioned on the other side of the device 100.

The device 100 may further include a user identity module (UIM) 124. The UIM 124 may be a memory device having a processor built in. The UIM 124 may include, for example, a subscriber identity module (SIM), a universal integrated circuit card (UICC), a universal subscriber identity module (USIM), a removable user identity module (R-UIM), or any other smart card. The UIM 124 typically stores information elements related to a mobile subscriber. In addition to the UIM 124, the device 100 may be equipped with memory. For example, the device 100 may include volatile memory 126, such as volatile random access memory (RAM) including a cache area for the temporary storage of data. The device 100 may also include other non-volatile memory 128, which may be embedded and/or may be removable. The non-volatile memory 128 may additionally or alternatively comprise an electrically erasable programmable read only memory (EEPROM), flash memory, hard drive, or the like. The memories may store any number of pieces of information, and data, used by the device 100 to implement the functions of the device 100.

Figure 2:
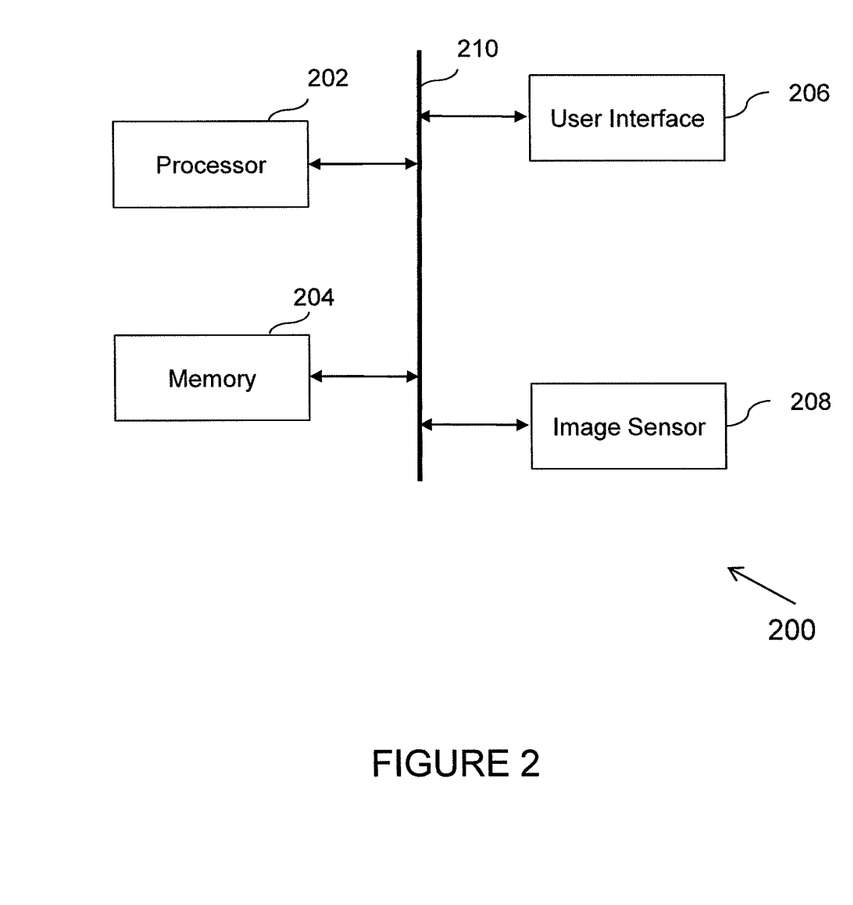
FIG. 2 illustrates an apparatus for classifying test objects in accordance with an example embodiment.

FIG. 2 illustrates an apparatus 200 for classifying test objects in accordance with an example embodiment. The apparatus 200 may be employed, for example, in the device 100 of FIG. 1. However, it should be noted that the apparatus 200, may also be employed on a variety of other devices both mobile and fixed, and therefore, embodiments should not be limited to application on devices such as the device 100 of FIG. 1. In an example embodiment, the apparatus 200 is a mobile phone, which may be an example of a communication device. Alternatively or additionally, embodiments may be employed on a combination of devices including, for example, those listed above. Accordingly, various embodiments may be embodied wholly at a single device, for example, the device 100 or in a combination of devices. It should be noted that some devices or elements described below may not be mandatory and thus some may be omitted in certain embodiments.

The apparatus 200 includes or otherwise is in communication with at least one processor 202 and at least one memory 204. Examples of the at least one memory 204 include, but are not limited to, volatile and/or non-volatile memories. Some examples of the volatile memory includes, but are not limited to, random access memory, dynamic random access memory, static random access memory, and the like. Some example of the non-volatile memory includes, but are not limited to, hard disks, magnetic tapes, optical disks, programmable read only memory, erasable programmable read only memory, electrically erasable programmable read only memory, flash memory, and the like. The memory 204 may be configured to store information, data, applications, instructions or the like for enabling the apparatus 200 to carry out various functions in accordance with various example embodiments. For example, the memory 204 may be configured to buffer input data comprising media content for processing by the processor 202. Additionally or alternatively, the memory 204 may be configured to store instructions for execution by the processor 202.

An example of the processor 202 may include the controller 108. The processor 202 may be embodied in a number of different ways. The processor 202 may be embodied as a multi-core processor, a single core processor; or combination of multi-core processors and single core processors. For example, the processor 202 may be embodied as one or more of various processing means such as a coprocessor, a microprocessor, a controller, a digital signal processor (DSP), a graphic processing unit (GPU), processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an example embodiment, the multi-core processor may be configured to execute instructions stored in the memory 204 or otherwise accessible to the processor 202. Alternatively or additionally, the processor 202 may be configured to execute hard coded functionality. As such, whether configured by hardware or software methods, or by a combination thereof, the processor 202 may represent an entity, for example, physically embodied in circuitry, capable of performing operations according to various embodiments while configured accordingly. For example, if the processor 202 is embodied as two or more of an ASIC, FPGA or the like, the processor 202 may be specifically configured hardware for conducting the operations described herein. Alternatively, as another example, if the processor 202 is embodied as an executor of software instructions, the instructions may specifically configure the processor 202 to perform the algorithms and/or operations described herein when the instructions are executed. However, in some cases, the processor 202 may be a processor of a specific device, for example, a mobile terminal or network device adapted for employing embodiments by further configuration of the processor 202 by instructions for performing the algorithms and/or operations described herein. The processor 202 may include, among other things, a clock, an arithmetic logic unit (ALU) and logic gates configured to support operation of the processor 202.

A user interface 206 may be in communication with the processor 202. Examples of the user interface 206 include, but are not limited to, input interface and/or output user interface. The input interface is configured to receive an indication of a user input. The output user interface provides an audible, visual, mechanical or other output and/or feedback to the user. Examples of the input interface may include, but are not limited to, a keyboard, a mouse, a joystick, a keypad, a touch screen, soft keys, and the like. Examples of the output interface may include, but are not limited to, a display such as light emitting diode display, thin-film transistor (TFT) display, liquid crystal displays, active-matrix organic light-emitting diode (AMOLED) display, a microphone, a speaker, ringers, vibrators, and the like. In an example embodiment, the user interface 206 may include, among other devices or elements, any or all of a speaker, a microphone, a display, and a keyboard, touch screen, or the like. In this regard, for example, the processor 202 may comprise user interface circuitry configured to control at least some functions of one or more elements of the user interface 206, such as, for example, a speaker, ringer, microphone, display, and/or the like. The processor 202 and/or user interface circuitry comprising the processor 202 may be configured to control one or more functions of one or more elements of the user interface 206 through computer program instructions, for example, software and/or firmware, stored on a memory, for example, the at least one memory 204, and/or the like, accessible to the processor 202.

In an example embodiment, the apparatus 200 may include an electronic device. Some examples of the electronic device include communication device, media capturing device with communication capabilities, computing devices, and the like. Some examples of the communication device may include a mobile phone, a personal digital assistant (PDA), and the like. Some examples of computing device may include a laptop, a personal computer, and the like. In an example embodiment, the communication device may include a user interface, for example, the UI 206, having user interface circuitry and user interface software configured to facilitate a user to control at least one function of the communication device through use of a display and further configured to respond to user inputs. In an example embodiment, the communication device may include a display circuitry configured to display at least a portion of the user interface of the communication device.

The display and display circuitry may be configured to facilitate the user to control at least one function of the communication device.

In an example embodiment, the communication device may be embodied as to include a transceiver. The transceiver may be any device operating or circuitry operating in accordance with software or otherwise embodied in hardware or a combination of hardware and software. For example, the processor 202 operating under software control, or the processor 202 embodied as an ASIC or FPGA specifically configured to perform the operations described herein, or a combination thereof, thereby configures the apparatus or circuitry to perform the functions of the transceiver. The transceiver may be configured to receive media content. Examples of media content may include audio content, video content, data, and a combination thereof.

In an example embodiment, the communication device may be embodied as to include an image sensor, such as an image sensor 208. The image sensor 208 may be in communication with the processor 202 and/or other components of the apparatus 200. The image sensor 208 may be in communication with other imaging circuitries and/or software, and is configured to capture digital images or to make a video or other graphic media files. The image sensor 208 and other circuitries, in combination, may be an example of the camera module 122 of the device 100.

These components (202-208) may communicate to each other via a centralized circuit system 210 to perform classification of test objects in a gallery comprising a plurality of classes. The centralized circuit system 210 may be various devices configured to, among other things, provide or enable communication between the components (202-208) of the apparatus 200. In certain embodiments, the centralized circuit system 210 may be a central printed circuit board (PCB) such as a motherboard, main board, system board, or logic board. The centralized circuit system 210 may also, or alternatively, include other printed circuit assemblies (PCAs) or communication channel media.

In an example embodiment, the processor 202 is configured to, with the content of the memory 204, and optionally with other components described herein, to cause the apparatus 200 to perform open set classification and closed set classification of test objects. In an example embodiment, the open set classification of test objects refers to classifying test objects into classes that are already trained in a gallery. In one example embodiment, in the open set classification, the apparatus 200 is configured to determine if the test objects do not belong to any class in the gallery, and in an example embodiment the apparatus 200 is configure to classify the test object such that the test object does not belong to a trained class. For example, the test object may be classified in an untrained class, or may be added as a new class in the gallery.

The gallery may be a database or a storage location, for example, the memory 204 in the apparatus 200 and/or one or more storage locations that are external to the apparatus 200 and are accessible/controlled by the processor 202. In some forms, the gallery may also refer to a collection of content, for example, a plurality of images of objects, where such content are stored in one or more memory locations. For instance, the gallery (a collection of classes associated with the plurality of images) may be stored in one or more storage locations in the apparatus 200 such as the memory 204, or one or more storage locations external to the apparatus 200. In certain example embodiments, the classes of the gallery are trained classes. In an example embodiment, trained classes as stored in the gallery or forming the gallery are classes that are already known. For instance, a trained class may be associated with one or more representations of a known object. Examples of an object may include any living or non-living entity visible to human eyes, such as a person, a cat, a horse, a book, a playground, a mountain, and the like. In some instance, a class may correspond to a particular object such as an individual person for example 'John' or 'Lucy', or a particular playground such as a playground related to rugby. However, in some instance, a class may correspond to similar objects such as people having blonde appearance, or playgrounds that are related to a number of outdoor sports such as football, rugby, hockey, tennis, and the like. For instance, a plurality of images of playgrounds in various views may be stored as a single class named 'playground' in the gallery.

Various examples embodiments provide methods and systems for performing open set classification of test objects into known (trained) classes of the gallery, or in untrained classes. Some example embodiments also provide method and systems for performing closed set classification of test objects into known classes of the gallery. The test object may be an object corresponding to a class of the gallery, and in certain instances, the test object may not correspond to a class present of the gallery and is accordingly classified in an untrained class or is not classified. In an example embodiment, classifying the test object in the untrained class represents that the test object is not classified in a trained class of the gallery. In some forms, the test objects may be received from a multimedia content such as video, animation and other graphic files. The test object may be any object such as face of a person or any other living or non-living objects. In some forms, the test object may also be captured using the image sensor 208 of the apparatus 200.

In an example embodiment, the processor 202 is configured to, with the content of the memory 204, and optionally with other components described herein, to cause the apparatus 200 to access a gallery comprising a plurality of classes. In an example embodiment, the processor 202 is configured to, with the content of the memory 204, and optionally with other components described herein, to cause the apparatus 200 to determine distances between classes of the plurality of classes. In an example embodiment, various distances between different pairs of classes of the gallery may be determined. For instance, for a given class, its distance with at least one remaining class of the plurality of classes may be determined. In an example embodiment, for a class, its distance from each of the plurality of classes of the gallery is determined. Without limiting to the scope of various example embodiments, a distance between two classes may represent subspace distance between the two classes. For example, in linear algebra terms, a subspace may be determined for a class. For instance, a class may be modeled based on one or more representations of a same object such as, frontal views, side views of a face of a person such as 'John'. In certain example embodiments, a subspace may be computed based on the one or more representations of the faces of 'John'. In certain instances, for determining the subspace distances between two classes, for example, two faces, methods such as 'mutual subspace method', and the like may be used. In an example embodiment, a subspace distance between two classes may be mean distance between both subspaces. In other example embodiments, distance between two classes may be determined in terms of other distance measures such as degree of similarity/matching between the two classes. In one form, the degree of similarity may be determined by feature based matching, template based matching, full or partial pixel patterns matching of the two classes. Other examples of distance between two subspaces include kernel principal component analysis based distance, principal angles, and the like.

In an example embodiment, the processor 202 is configured to, with the content of the memory 204, and optionally with other components described herein, to cause the apparatus 200 to determine thresholds for one or more classes of the gallery. In an example embodiment, the thresholds for the one or more classes are used to determine whether a test object is capable of being classified in a class or not. In an example embodiment, the apparatus 200 is caused to determine threshold for each class of the gallery in an adaptive manner. In an example embodiment, threshold for a class is determined based at least in part on at least one distance of the class from at least one remaining class of the plurality of classes. For instance, in an example embodiment, the apparatus 200 is caused to determine the threshold for a class by determining a lowest distance (such as lowest subspace distance) of the at least one distance, and selecting the threshold for the class as substantially equal to half of the lowest distance.

For example, if there are N number of classes enrolled/present in the gallery, the subspace distance between different pairs of classes ($\lambda i$ and $\lambda j$) may be determined that may be represented as:

$$d(\lambda i, \lambda j), \text{ where } i=1 \text{ to } N, j=1 \text{ to } N, \text{ and } i \text{ is not equal to } j.$$

In an example embodiment, for $i^{th}$ class ($\lambda i$), the threshold may be determined based on min $\{d(\lambda i, \lambda j)\}$ where the minimum distance is determined over $j=1$ to N, and j is not equal to i. For example, the threshold for the $i^{th}$ class may be substantially equal to the half of the minimum subspace distance as per the following expression:

$$thr(i) \approx \frac{1}{2} * \min\{d(\lambda i, \lambda j)\} \text{ where the minimum is over } j=1 \text{ to } N, j \text{ not equal to } i.$$

In some example embodiments, the threshold for the $i^{th}$ class may be equal to the half of the minimum subspace distance. In an example embodiment, for each class of the gallery, a corresponding threshold is determined based on its closest distance with any other class of the gallery, so each class may have a distinct threshold that is adaptive in nature.

In an example embodiment, the apparatus 200 is caused to classify a test object based on the determined thresholds for the one or more classes of the gallery. In an example embodiment, the apparatus 200 may access the test object from multimedia content such as video, pictures, animations or other graphic content. In some example embodiments, the test object may be accessed by the apparatus from external devices, or may be accessed from a storage location such as the memory 204 or other such storage devices.

In an example embodiment, the apparatus 200 is caused to determine a set of distances of the test object from a set of classes of the gallery. For instance, distances of the test object from the set of classes such as entire or some of the classes of the gallery may be determined. In an example embodiment, for determining a distance of a class from a test object such as a test face, a subspace corresponding to the test face is estimated. In an example embodiment, a near frontal test face and its horizontally flipped version may be used to estimate a subspace corresponding to the test face. In an example embodiment, a subspace distance between a class and the test object may be mean distance between both subspaces. In an example embodiment, the apparatus 200 is caused to select a class of the set of classes that is closest to the test object based on the set of distances. For example, the class having the lowest subspace distance from the test object may be selected. In an example embodiment, in the open set classification, the apparatus 200 is caused to determine whether the test object may be classified in the selected class based on a comparison of a threshold corresponding to the selected class and a distance between the selected class and the test object. In an example embodiment, in the closed set classification, the test object may be classified in the selected class with an unconfirmed status and a confirmed status based on the comparison of the threshold corresponding to the selected class and the distance between the selected class and the test object.

For example, there are N unique classes of the gallery represented by $\lambda_i$, where $i=1$ to N. In this example, a test object such as a face is denoted by x, and $d(x, \lambda_i)$ denote a distance such as a subspace distance between the test object x and the $i^{th}$ class. The apparatus 200 is caused to determine the subspace distances of the test object from the classes of the gallery $d(x, \lambda_i)$, where i varies from 1 to N. In an example embodiment, the apparatus 200 is caused to determine the lowest subspace distance (d*) of the subspace distances (for example, $d^* = \min\{d(x, \lambda_i)\}$ where the minimum is over $i=1$ to N). In this example, the apparatus 200 is caused to select the class ($\lambda^*$) corresponding to the lowest subspace distance d*, for example $\lambda^* = \arg\min\{d(x, \lambda_i)\}$ where the minimum is over $i=1$ to N.

In an example embodiment, in the open set classification, the apparatus 200 is caused to classify the test object 'x' in the selected class '$\lambda^*$', if the subspace distance of the selected class '$\lambda^*$' from the test object 'x' (for example, the subspace distance d*) is less than the threshold for the selected class '$\lambda^*$' (for example, the threshold 'thr($\lambda^*$)'). In an example embodiment, the test object 'x' may be classified in an untrained class, if the subspace distance (d*) of the selected class ($\lambda^*$) from the test object (d*) is equal or greater than the threshold (thr($\lambda^*$)). In another example embodiment, the apparatus 200 is not caused to perform any classification of the test object 'x', if the subspace distance (d*) of the selected class ($\lambda^*$) from the test object 'x' is equal or greater than the threshold 'thr($\lambda^*$)'.

For instance, in an example embodiment, the test object 'x' such as an image having a face may be classified by executing the following:

```
If (d* < thr(λ*))
    Face in the image = λ*;
Else {
    Face not classified / classified in an untrained class
}
``` where thr($\lambda^*$) denotes the threshold corresponding to the class $\lambda^*$.

In an example, in terms of a geometric interpretation of classes of the gallery, a circle may be assumed around patterns of each class, in a two dimensional subspace. In this example, the radius (r) of the circle corresponding to a class may be determined based on a subspace distance of the closest class from the class (for example, the radius may be equal to the threshold corresponding to the class). In an example embodiment, if a test object lies within the boundary of a circle, (for instance d* (for example, $\min\{d(x, \lambda_i)\}$) is less than the 'r'), the test object may be classified in the class corresponding to the circle of the gallery. If the test object does not lie within the boundary of the circle (for example, d* is equal or greater than the 'r'), the test object may not be classified or may be classified in an unnamed class of the gallery.

Figure 3A:
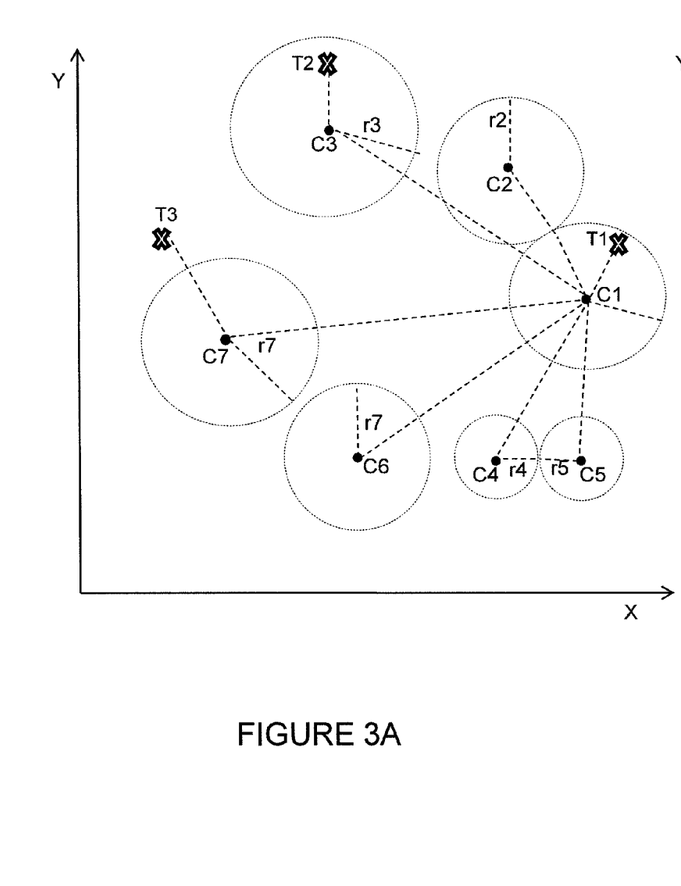
FIG. 3A is an example representation of classes and test objects in a two dimensional subspace representation in accordance with an example embodiment.

An example representation of classification of test objects is shown in FIG. 3A. FIG. 3A is an example representation of classes and test objects in a two-dimensional subspace representation. For instance, subspaces of a plurality of classes C1, C2, C3, C4, C5, C6 and C7 of a gallery are shown in an X-Y plane. The apparatus 200 is caused to determine thresholds for the classes (C1-C7), based on a subspace distance of a given class from the remaining classes. For example, for the class 'C1', various subspace distances between the class 'C1' and other classes is determined, such as d(C1, C2), d(C1, C3), d(C1, C4), d(C1, C5), d(C1, C6) and d(C1, C7). As shown in the FIG. 3A, the apparatus 200 is caused to determine the lowest subspace distance of the various subspace distances determined for the class 'C1'. In the example shown in FIG. 3A, the pair of classes (C1, C2) are spaced apart by the lowest subspace distance than other pairs of classes (C1, C3), (C1, C4), (C1, C5), (C1, C6) and (C1, C7). In this example, the threshold for the class 'C1' may be determined as substantially equal to the half of the subspace distance between the 'C1' and 'C2'. In one form, the threshold for the class 'C1' may be equal to the half of the subspace distance between the 'C1' and 'C2'. For instance, the threshold for the class 'C1' may be represented as 'r1' as defined by following expression:

$$r1 \approx \tfrac{1}{2} * d(C1, C2),$$

where d(C1, C2) represents subspace distance between classes 'C1' and 'C2'. In a similar manner, thresholds for other classes C2-C7 may be determined as r2-r7. In an example as shown in FIG. 3A, a circle may be drawn in a subspace plane around a class having radius equal to the threshold of the class. In an example embodiment, if in the subspace plane, a test object lies within the boundary of the circle corresponding to a class, the test object may be classified in the class. For example, as shown in FIG. 3A, a test object 'T1' lies within the circle of the class 'C1' having a radius equal to its threshold 'r1', the test object 'T1' is classified in the class 'C1'.

In an example embodiment, for classifying the 'T1' into a class of the gallery, subspace distances of various classes from the 'T1' is determined. For example, various subspace distances such as d(T1, C1) to d(T1, C7), may be determined. As the d(T1, C1) is the lowest subspace distance among the various subspace distances, the class 'C1' is selected and the subspace distance d(T1, C1) is compared with the threshold 'r1' of the selected class 'C1' for determining whether the test object 'T1' can be classified in the class 'C1' or not. In the example shown in FIG. 3A, as the d (T1, C1) is less than the threshold r1 of the class 'C1' (also evident from the fact that the 'T1' lies within the boundary of the circle corresponding to 'C1'), the test object 'T1' is classified in the class 'C1'.

In another example, for a test object 'T2', a class having the lowest subspace distance is 'C3' as shown in FIG. 3A. In this example, for classifying the 'T2', the distance d (T2, C3) is compared with the threshold 'r3' of the class 'C3'. As the d (T2, C3) is less than the threshold r3 of the class 'C3' (also evident from the fact that the 'T2' lies within the boundary of the circle corresponding to 'C3'), the test object 'T2' is classified in the class 'C3'.

In another example, for a test object 'T3', a class separated at the lowest subspace distance is 'C7' in the subspace plane, as shown in FIG. 3A. In this example, for classifying the 'T3', the distance d (T3, C7) is compared with the threshold 'r7' of the class 'C7'. As the d (T3, C7) is greater than the threshold 'r7' of the class 'C7' (also evident from the fact that the 'T2' lies outside the boundary of the circle corresponding to 'C2'), the test object 'T3' is classified in not classified in the class 'C7'. In one form, the test object 'T3' may be classified in the unnamed class of the gallery, or in another form, the test object 'T3' may not be classified of the gallery.

In some example embodiments, if subspace distances between two or more classes are low and a test object is relatively close to such classes, thresholds for these classes may be calculated based on the distance of the test object from these classes and distances between these classes. In these example embodiments, the thresholds determined for such classes are very conservative and may be lower than thresholds which would be otherwise calculated from a technique described in FIG. 3A.

Figure 3B:
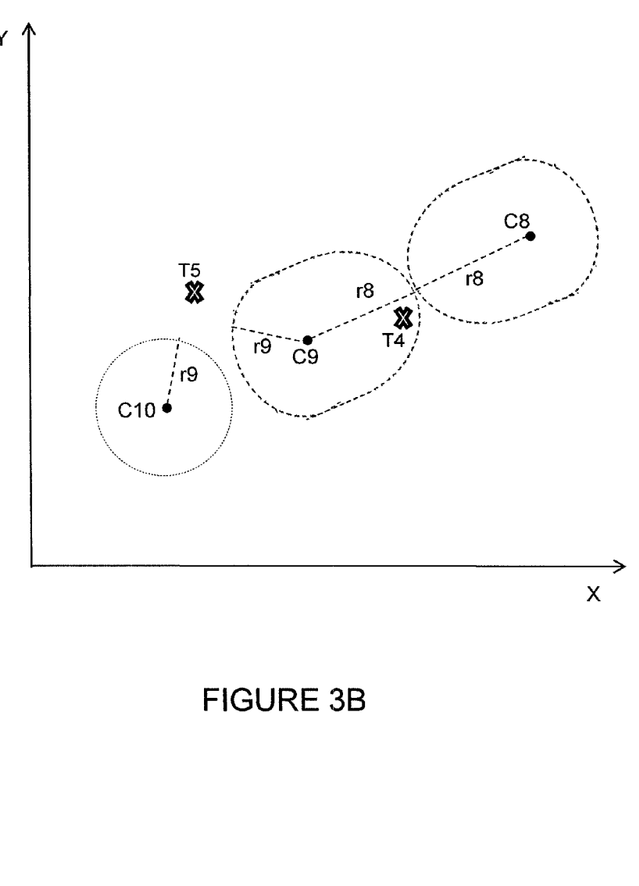
FIG. 3B is an example representation of classes and test objects in a two dimensional subspace representation in accordance with another example embodiment.

In these example embodiments, an apparatus 200 is caused to select a set of nearest classes from the test object based on the distances of various classes of the gallery from the test object. For example, k number of nearest classes from the test object may be selected. In an example embodiment, the apparatus 200 is caused to determine a common threshold for the K nearest classes. For instance, the threshold for the K nearest classes of the test object may be a function of the distances between classes of the K nearest classes. For instance, in an example embodiment, the threshold may be determined as substantially equal to half of the distance between two classes of the K nearest classes that are closest to the test object. For example, from the K nearest classes ($\lambda_i$, where I=1 to K), a first class ($\lambda_1$) may be identified that is closest to the test object 'X', and a second class ($\lambda_2$) may be identified that is closest to the test object after the first class ($\lambda_4$). In this example, embodiment, the threshold (thr) for the K nearest classes may be based on the expression:

$$thr \approx \tfrac{1}{2} * d(\lambda 1, \lambda 2),$$

where d(x, $\lambda 1$)<d(x, $\lambda 2$), and d(x, $\lambda 2$)<d(x, $\lambda m$), where m varies from 3 to K. In another representation, the threshold may be based on the expression:

$$thr \approx \tfrac{1}{2} * \min\{d(\lambda 1, \lambda j)\},$$

where j=2 to K, and where $\lambda 1 = \arg \min \{d(x, \lambda i)\}$ where i varies from 1 to K. An example representation of classification of test objects based on a threshold determined in this example embodiment is shown in FIG. 3B.

FIG. 3B is an example representation of classes and test objects in a two-dimensional subspace representation, in accordance with another example embodiment. In this example embodiment, classes 'C8', 'C9' and 'C10' are shown in a gallery. The apparatus 200 is caused to determine thresholds for the classes (C8-C10), based on a subspace distance of a given class from at least one remaining class and distance of a test object 'T4' from one or more classes of the classes C8-C10. In the example embodiment shown in FIG. 3B, for classifying the test object 'T4', a set of nearest classes (K number of nearest classes) from the test object 'T4', for example, the classes 'C8' and 'C9' are selected (if K=2). In an example embodiment, the threshold for the classes 'C8' and 'C9' are substantially equal to half of the distance between classes 'C8' and 'C9'. For instance, the threshold for the classes 'C8' and 'C9' is represented as 'r8' that is substantially equal to half of the subspace distance between 'C8' and 'C9' (for example, ½*d(C8, C9)). In an example embodiment, the threshold for the classes 'C8' and 'C9' for classifying the test object 'T4' may be equal to the half of the subspace distance between 'C8' and 'C9'.

In this example embodiment, for a class, such as 'C8', there may be one or more thresholds, and each threshold is determined based on the location of a test object with respect to the class in a subspace plane. For instance, for classifying another test object 'T5', the applicable threshold for the class 'T8' is shown as 'r9'. For example, a set of nearest classes from the test object 'T5', such as classes 'C9' and 'C10' are selected. In this example, a threshold substantially equal to half of the subspace distance between 'C9' and 'C10' (for example, ½*d (C9, C10)) is determined for the classes 'C9' and 'C10' for performing classification of the test object 'T5' in the gallery. In the example representation shown in FIG. 3B, one or more thresholds for a class varies depending upon the location of a test object. For instance, based on the location of the test object 'T4', the threshold for the class 'C9' is determined as 'r8', and based on the location of the test object 'T5', the threshold for the class 'C9' is determined as 'r9'.

In this example representation, for classifying the test object 'T4', a class is selected that is closest to the test object 'T4' based on the distances of the classes 'C8', 'C9' and 'C10' from the test object 'T4'. For instance, the class 'C9' is closest to the test object 'T4', and accordingly, the class 'C9' is selected for determining whether the test object 'T4' can be classified in the class 'C9' or not. In an example embodiment, if the subspace distance of the selected class from a test object is less than the determined threshold, the test object is classified in the selected class. In this example representation of FIG. 3B, as the subspace distance of the selected class 'C9' from the test object 'T4' is less than the determined threshold 'r8' (evident from that fact that the test object 'T4' lies within boundary of a section of a circle associated with class 'C9' with radius 'r8'), the test object 'T4' is classified in the class 'C9'.

In an example embodiment, the apparatus 200 is caused to classify a test object in an untrained class, if the subspace distance of the selected class from the test object is equal or greater than the determined threshold. In this example representation of FIG. 3B, for classifying the test object 'T5', a class is selected that is closest to the test object 'T5' based on the distances of the classes 'T8', 'C9' and 'C10' from the test object 'T5'. For instance, the class 'C10' is closest to the test object 'T5', and accordingly, the class 'C10' is selected for determining whether the test object 'T5' can be classified in the class 'C10' or not. As the subspace distance of the selected class 'C10' from the test object 'T5' is greater than the determined threshold 'r9' (also evident that the test object 'T5' lies outside a boundary of a section of a circle associated with class 'C9' with radius 'r8'), the test object 'T5' is not classified of the gallery. In some alternate embodiments, the test object 'T5' may be classified in an untrained class of the gallery. In some alternate embodiments, the test object 'T5' may be added of the gallery as a new trained class.

In some example embodiments, the classification of the test object in the selected class may be assigned with status such as a confirmed status and an unconfirmed status in performing the open set classification and the closed set classification of the test objects. In an example embodiment, the confirmed status of the classification of the test object in the selected class may represent a case where the classification may be considered as accurate (for example, there may not be chances of false classification), whereas the unconfirmed status may represent a classification where the classification may not be considered as accurate (for example, there may be chances of false classification). In such example embodiments, the apparatus 200 is caused to assign one of the confirmed status and the unconfirmed status to the classification of the test object based on a comparison of the distance between the selected class and the test object and a status threshold.

In an example embodiment, the apparatus 200 is caused to assign the confirmed status to the classification of the test object if the distance between the selected class and the test object is equal or less than the status threshold. In an example embodiment, for the open set classification, the status threshold is less than the threshold for the selected class. For instance, as the threshold for the selected class is substantially half of a subspace distance (for example, between the selected class and the closest class of the selected class), the status threshold may be selected as substantially equal to one fourth (or other values smaller than half) of the subspace distance. In an example embodiment, for the closed set classification, the status threshold may be same as the threshold for the selected class.

In this example embodiment, the apparatus 200 is caused to assign the unconfirmed status if the distance between the selected class and the test object is more than the status threshold. In an example, in the open set classification, a distance of the test object from a selected class is 8 unit, the threshold for the selected class is 10 unit, and the status threshold is 5 unit. In this example, the test object is classified in the selected class, but an 'unconfirmed' status may be assigned to the classification as the distance of the test object from the class (8 unit) is more than the status threshold (5) for the class. In such example embodiments, there may be two thresholds for a class that can be utilized for the classification of test objects and for assigning a status to the classification. For example, a first threshold (the threshold for the selected class) may be used for classifying a test object based on a comparison of the distance of the test object from the first threshold, and a second threshold (the status threshold for the selected class) may be used to assign one of the confirmed and unconfirmed status to the classification of the test object. For the closed set classification, the status threshold is same as the threshold for the selected object, and in one example, if a distance of the test object from a selected class is 8 unit, the threshold (and status threshold) for the selected class is 10 unit, the test object is classified in the selected class with a confirmed status. In this example of the closed set classification, if a distance of the test object from a selected class is 12 unit and the threshold (and status threshold) for the selected class is 10 unit, the test object is classified in the selected class with a unconfirmed status.

In various example embodiments, an apparatus such as the apparatus 200 may comprise various components such as means for accessing a gallery comprising a plurality of classes, means for determining distances between classes of the plurality of classes, and means for determining thresholds for one or more classes of the gallery for classifying one or more test objects in the one or more classes, wherein threshold for a class is determined based at least in part on at least one distance of the class from at least one remaining class of the plurality of classes. Such components may be configured by utilizing hardware, firmware and software components. Examples of such means may include, but are not limited to, the processor 202 along with the memory 204, the UI 206, the image sensor 208.

In an example embodiment, the means for determining the threshold for the class comprises means for determining a lowest distance of the at least one distance, and means for selecting the threshold for the class as substantially equal to half of the lowest distance. Examples of such means may non-exhaustively include the processor 202 and the memory 204. In an example embodiment, the apparatus further comprises means for accessing a test object, means for determining a set of distances of the test object from a set of classes of the gallery, means for selecting a class of the set of classes that is closest to the test object based on the set of distances, and means for classifying the test object in the selected class based on a comparison of a threshold for the selected class and a distance between the selected class and the test object. In an example embodiment, the apparatus further comprises means for classifying the test object in the selected class, if the distance of the selected class from the test object is less than the threshold for the selected class. In an example embodiment, the apparatus further comprises means for classifying the test object in an untrained class, if the distance of the selected class from the test object is equal or greater than the threshold for the selected class. Examples of such means may non-exhaustively include the processor 202 and the memory 204.

In an example embodiment, the apparatus further comprises means for accessing a test object, means for determining a set of distances of the test object from a set of classes of the gallery, means for selecting, the set of classes, a set of nearest classes from the test object based on the set of distances, and means for determining a threshold for the set of nearest classes based on a function of distances between classes of the set of nearest classes. In an example embodiment, the threshold is substantially equal to half of a distance between two classes of the set of nearest classes that are closest to the test object. In an example embodiment, the apparatus further comprises means for selecting a class of the set of nearest classes that is closest to the test object based on the set of distances, and means for classifying the test object in the selected class based on a comparison of the determined threshold and a distance between the selected class and the test object. In an example embodiment, the apparatus further comprises means for classifying the test object in the selected class, if the distance of the selected class from the test object is less than the determined threshold, and means for classifying the test object in an untrained class, if the subspace distance of the selected class from the test object is equal or greater than the determined threshold. In an example embodiment, the plurality of classes of the gallery comprises a plurality of trained classes. In an example embodiment, the plurality of training classes comprises a plurality of faces. In an example embodiment, the test object may be a face, and a distance between classes is a subspace distance.

Figure 4:
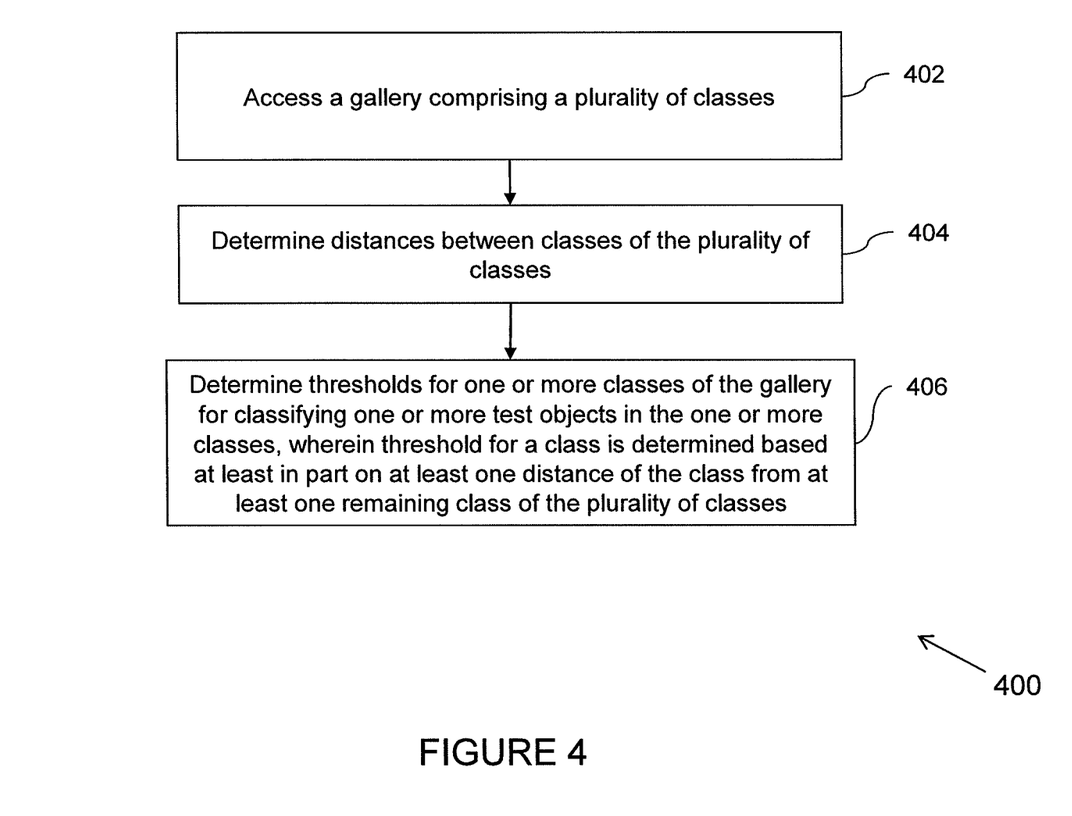
FIG. 4 is a flowchart depicting an example method in accordance with an example embodiment.

FIG. 4 is a flowchart depicting an example method 400 in accordance with an example embodiment. The method 400 depicted in flow chart may be executed by, for example, the apparatus 200. It may be understood that for describing the method 400, references herein may be made to FIGS. 1-3B.

At block 402, the method 400 includes accessing a gallery comprising a plurality of classes. The gallery containing the classes may be stored in the apparatus 200 or may be stored in an external storage accessible to the apparatus 200. At block 404, the method 400 includes determining distances between classes of the plurality of classes of the gallery. In an example embodiment, the distance between the classes may be determined in terms of subspace distances between subspaces of the classes. In an example embodiment, various subspace distances between pairs of classes may be determined. At block 406, the method 400 includes determining thresholds for one or more classes of the gallery for classifying one or more test objects in the one or more classes. In an example embodiment, a threshold for a class is determined based at least in part on at least one distance of the class from at least one remaining class of the plurality of classes. Various embodiments of classifications of test objects are further described in FIGS. 5 and 6.

Figure 5:
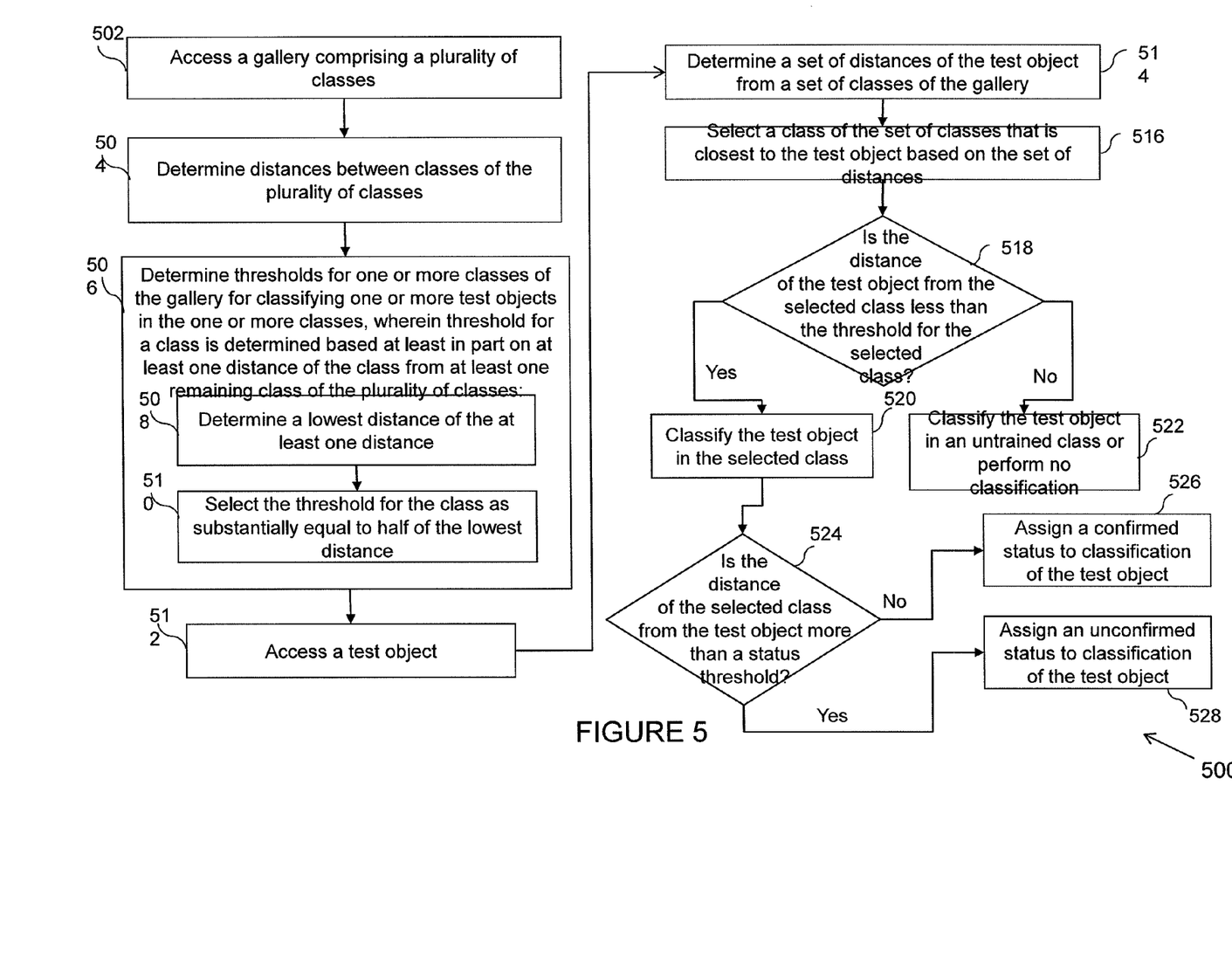
FIG. 5 is a flowchart depicting an example method for classifying test objects in accordance with another example embodiment.

FIG. 5 is a flowchart depicting an example method 500 for classifying test objects in accordance with another example embodiment. The method 500 depicted in flow chart may be executed by, for example, the apparatus 200. It may be understood that for describing the method 500, references herein may be made to FIGS. 1-5. It should be noted that that although the method 500 of FIG. 5 shows a particular order, the order need not be limited to the order shown, and more or fewer blocks may be executed, without providing substantial change to the scope of the various example embodiments.

At 502, the method 500 starts and a gallery comprising a plurality of classes is accessed. At 504, the method 500 includes determining distances between classes of the plurality of classes. For instance, distances between various pairs of classes may be determined. For example, if there are N numbers of classes of the gallery, the N×N distance matrix may be computed using a distance measure such as a subspace distance between the classes, where each row of the matrix represents subspace distances of a particular class to the remaining classes of the gallery.

At 506, the method 500 includes determining thresholds for the one or more classes of the gallery. In an example embodiment, thresholds are utilized for determining whether a test object is capable of being classified in any of the classes of the gallery or not. In an example embodiment, a threshold for a class is determined based on at least one distance of class from at least one remaining class of the gallery. In an example embodiment, the threshold is determined for each class of the gallery. The method 500 performs determining thresholds for the classes of the gallery by performing operations of block 508 and 510. At block 508, for determining a threshold for a class, a minimum distance is determined from various distances of the class from the remaining classes of the gallery. For instance, a minimum non-zero distance from each row of N×N distance matrix is chosen as the threshold for the corresponding class of the row. At block 510, threshold for the class is selected as substantially equal to half of the minimum distance associated with the class. In some example embodiments, the threshold may be equal to the half of the minimum distance associated with the class.

At block 512, a test object is accessed. The test object may or may not correspond to an object corresponding to a class of the gallery. At block 514, a set of distances such as subspace distances of the test object from a set of classes of the gallery, is determined. In an example embodiment, the set of classes may include each class of the gallery. At block 516, a class is selected from the set of classes that is closest to the test object based on the determined distances. For instance, a minimum distance of the set of distances may be determined and the class corresponding to the minimum distance is selected.

At block 518, it is checked whether the distance of the selected class from the test object is less than the threshold for the selected class. In an example embodiment, if it is determined that the distance of the test object from the selected class is less than the threshold for the selected class, the test object is classified in the selected class of the gallery, at 520. In an example embodiment, if it is determined that the distance of the test object from the selected class is equal or more than the threshold for the selected class, the test object may not be classified of the gallery, at block 522. In another example embodiment, if it is determined that the distance of the test object from the selected class is equal or more than the threshold for the selected class, the test object may be classified in an untrained class of the gallery, at block 522. In certain example embodiment, the untrained class may be enrolled in the gallery as a new trained class, once the test object is classified in the untrained class.

In an example embodiment, at block 524, the method 500 includes determining whether the distance between the test object and the selected class (in which the test object is classified) is more than a status threshold. In an example embodiment, the status threshold is selected as less than the threshold for the selected class. For instance, as the threshold for the selected class is substantially half of a subspace distance (for example, between the selected class and the closest class of the selected class), the status threshold may be selected as substantially equal to one fourth (or other values smaller than half) of the subspace distance. In an example embodiment, the method 500 includes assigning one of the confirmed status and the unconfirmed status to the classification of the test object based on a comparison of the distance between the selected class and the test object and a status threshold.

In an example embodiment, if it is determined that the distance between the selected class and the test object is equal or less than the status threshold, the method 500 includes assigning the confirmed status to the classification of the test object at block 526. In this example embodiment, if it is determined that the distance between the selected class and the test object is more than the status threshold, the method 500 includes assigning the unconfirmed status to the classification, at block 528.

Figure 6:
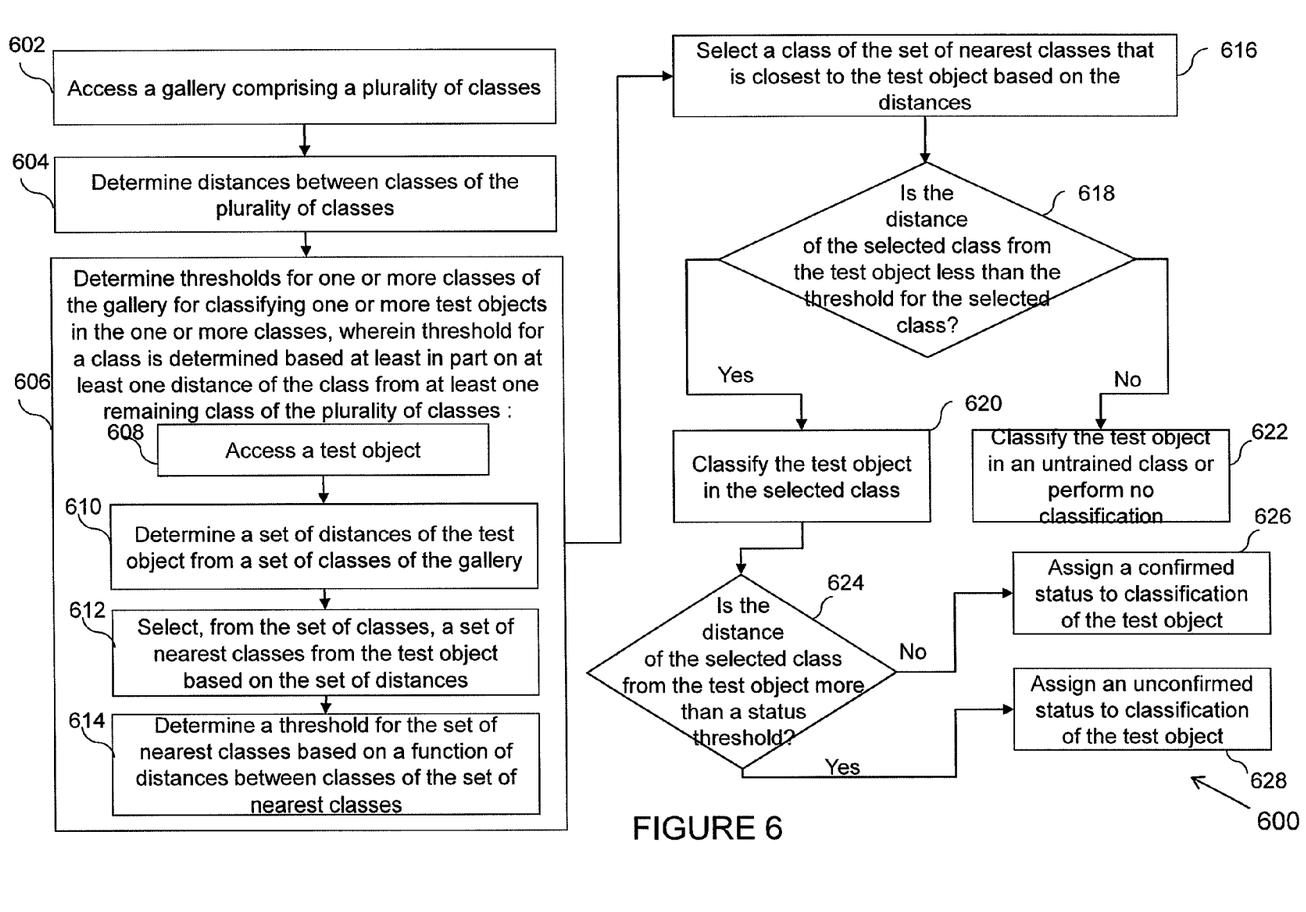
FIG. 6 is a flowchart depicting an example method for classifying test objects in accordance with another example embodiment.

FIG. 6 is a flowchart depicting an example method 600 for classifying test objects in accordance with another example embodiment. The method 600 depicted in flow chart may be executed by, for example, the apparatus 200. It may be understood that for describing the method 600, references herein may be made to FIGS. 1-5. It should be noted that that although the method 600 of FIG. 6 shows a particular order, the order need not be limited to the order shown, and more or fewer blocks may be executed, without providing substantial change to the scope of the various example embodiments.

At 602, the method 600 starts and a gallery comprising a plurality of classes is accessed. At 604, the method 600 includes determining distances between classes of the plurality of classes. For instance, distances between various pairs of classes may be determined. At 606, the method 600 includes determining thresholds for the one or more classes of the gallery. In an example embodiment, thresholds are utilized for determining whether one or more test objects are capable of being classified in the classes of the gallery or not. In an example embodiment, a threshold for a class is determined based on at least one distance of class from at least one remaining class of the gallery. In an example embodiment, the threshold is determined for each class of the gallery.

The method 600 performs determining thresholds for the classes of the gallery by performing operation of block 608, 610, 612 and 614. At block 608, a test object that is to be classified, is accessed. In an example embodiment, accessing the test object comprises accessing a subspace representing the test object. At block 610, the method 600 includes determining a set of distances of the test object from a set of classes of the gallery. In an embodiment, the set of classes may include each class of the gallery, or some classes of the gallery. At block 612, from the set of classes, a set of nearest classes from the test object are selected based on the subspace distances. For example, a pre-determined number of nearest classes (for example, 2) may be selected from the set of classes of the gallery. At block 614, a threshold is determined for the set of nearest classes as a function of subspace distances between classes of the set of nearest classes. In an example embodiment, the determined threshold is used for determining whether the test object can be classified in a class of the gallery or not. In an example embodiment, the threshold for the set of nearest classes may be substantially equal to half of a distance between two classes of the set of nearest classes that are closest to the test object. In an example, if there are two nearest classes of the test object, the threshold for these two classes is substantially equal to the half of the distance between the two classes.

At 616, the method 600 includes selecting a class of the set of nearest classes that is closest to the test object based on the subspace distances. For example, from the two nearest classes 'C8' and 'C9', the class 'C9' is the closest class to the test object 'T4' (see, FIG. 3B), and the class 'C1' is selected for determining whether the test object can be classified in the class 'C1' or not. In an example embodiment, at 618, it is checked whether the distance of the selected class from the test object is less than the threshold for the selected class. In an example embodiment, if it is determined that the distance of the test object from the selected class is less than the threshold for the selected class, the test object is classified in the selected class of the gallery, at 620. In an example embodiment, if is determined that the distance of the test object from the selected class is equal or more than the threshold for the selected class, the test object may not be classified of the gallery, at block 622. In another example embodiment, if is it determined that the distance of the test object from the selected class is equal or more than the threshold for the selected class, the test object may be classified in an untrained class of the gallery, at block 622. In certain example embodiment, the untrained class may be added in the gallery as a trained class, once the test object is classified in the untrained class.

In an example embodiment, at block 624, the method 600 includes determining whether the distance between the test object and the selected class (in which the test object is classified) is more than a status threshold. In an example embodiment, the status threshold is selected as less than the threshold for the selected class. For instance, as the threshold for the selected class is substantially half of a subspace distance (for example, between the two classes of the set of nearest classes that are closest to the test object), the status threshold may be selected as substantially equal to one fourth (or other values smaller than half) of the subspace distance. In an example embodiment, the method 600 includes assigning one of the confirmed status and the unconfirmed status to the classification of the test object based on a comparison of the distance between the selected class and the test object and a status threshold.

In an example embodiment, if it is determined that the distance between the selected class and the test object is equal or less than the status threshold, the method 600 includes assigning the confirmed status to the classification of the test object at block 626. In this example embodiment, if it is determined that the distance between the selected class and the test object is more than the status threshold, the method 600 includes assigning the unconfirmed status to the classification, at block 628. In an example embodiment, the operations of the blocks 626 and 628 for assigning confirmed/unconfirmed status to the classification may be used for both the open set classification and the closed set classification of test objects.

In some example embodiments, both of the methods 500 and 600 may be utilized to determine thresholds for the classes and subsequently classifying the test objects in classes of the gallery. For example, if a test object lies close to a number of classes in terms of subspace distances, the method 600 described in the FIG. 6 may be used to determine thresholds for the classes that are close to the test object. Further, if a class is separated from the other remaining classes, by more than a predefined distance, the method 500 may be used to determine threshold for such class.

Operations of the flowcharts 400, 500 or 600, and combinations of operations in the flowcharts 400, 500 or 600, may be implemented by various means, such as hardware, firmware, processor, circuitry and/or other device associated with execution of software including one or more computer program instructions. For example, one or more of the procedures described in various embodiments may be embodied by computer program instructions. In an example embodiment, the computer program instructions, which embody the procedures, described in various embodiments may be stored by at least one memory device of an apparatus and executed by at least one processor in the apparatus. Any such computer program instructions may be loaded onto a computer or other programmable apparatus (for example, hardware) to produce a machine, such that the resulting computer or other programmable apparatus embody means for implementing the operations specified in the flowcharts 400, 500 or 600. These computer program instructions may also be stored in a computer-readable storage memory (as opposed to a transmission medium such as a carrier wave or electromagnetic signal) that may direct a computer or other programmable apparatus to function in a particular manner, such that the instructions stored in the computer-readable memory produce an article of manufacture the execution of which implements the operations specified in the flowchart. The computer program instructions may also be loaded onto a computer or other programmable apparatus to cause a series of operations to be performed on the computer or other programmable apparatus to produce a computer-implemented process such that the instructions, which execute on the computer or other programmable apparatus provide operations for implementing the operations in the flowchart. The operations of the methods 400, 500 and 600 are described with help of the apparatus 200. However, the operations of the methods 400, 500 and 600 can be described and/or practiced by using any other apparatus.

Without in any way limiting the scope, interpretation, or application of the claims appearing below, a technical effect of one or more of the example embodiments disclosed herein is to determine thresholds for various classes in a gallery for performing classification of test objects of the gallery. Various embodiments provided schemes for determining adaptive thresholds for classes of the gallery that result into more number of classifications of the test objects in respective classes of the gallery. In some embodiments, the thresholds for classes are adjusted dynamically in cases where there are a number of classes close to the test object in a distance measure. For example, as numbers of classes that are similar to the test object increases, chances of false classification of the test object may also increase. In such cases, various embodiments provide conservative determination of the threshold for such classes. If a person looks a bit different from all others enrolled of the gallery, the chances of misclassification are lower, a relatively higher threshold may be determined.

Various embodiments described above may be implemented in software, hardware, application logic or a combination of software, hardware and application logic. The software, application logic and/or hardware may reside on at least one memory, at least one processor, an apparatus or, a computer program product. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of an apparatus described and depicted in FIGS. 1 and/or 2. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with other. Furthermore, if desired, one or more of the above-described functions may be optional or may be combined.

Although various aspects of the embodiments are set out in the independent claims, other aspects comprise other combinations of features from the described embodiments and/or the dependent claims with the features of the independent claims, and not solely the combinations explicitly set out in the claims.

It is also noted herein that while the above describes example embodiments, these descriptions should not be viewed in a limiting sense. Rather, there are several variations and modifications, which may be made without departing from the scope of the present disclosure as, defined in the appended claims.

We claim:

1. A method comprising:
accessing a gallery comprising a plurality of classes geometrically represented as respective circles;
determining distances between classes of the plurality of classes;
determining thresholds for one or more classes of the gallery for classifying one or more test objects in the one or more classes, wherein the threshold for a class is determined based at least in part on at least one distance of the class from at least one remaining class of the plurality of classes, wherein determining the threshold for the class comprises determining a lowest distance of the at least one distance, and selecting the threshold for the class as substantially equal to half of the lowest distance, wherein the threshold for one class differs from the threshold for another class, and wherein the circle that geometrically represents the class has a radius based upon the threshold; and
analyzing a test object, wherein analyzing the test object comprises classifying the test object in a respective class in an instance in which the test object satisfies the threshold associated with the respective class and failing to place the test object in any of the one or more classes in an instance in which the test object fails to satisfy the thresholds associated with the one or more classes.

2. The method as claimed in claim 1, wherein analyzing the test object further comprises:
accessing the test object;
determining a set of distances of the test object from a set of classes of the gallery;
selecting a class of the set of classes that is closest to the test object based on the set of distances; and
classifying the test object in the selected class based on a comparison of a threshold for the selected class and a distance between the selected class and the test object.

3. The method as claimed in claim 2, further comprising:
classifying the test object in the selected class, if the distance of the selected class from the test object is less than the threshold for the selected class; or
classifying the test object in an untrained class, if the distance of the selected class from the test object is equal or greater than the threshold for the selected class.

4. The method as claimed in claim 2, further comprising:
assigning one of a confirmed status and a unconfirmed status to the classification of the test object based on a comparison of the distance between the selected class and the test object and a status threshold.

5. The method as claimed in claim 4, further comprising:
assigning the confirmed status to the classification of the test object, if the distance between the selected class and the test object is equal or less than the status threshold, wherein the status threshold is selected as less than the threshold for the selected class; or
assigning the unconfirmed status to the classification of the test object, if the distance between the selected class and the test object is more than the status threshold, wherein the status threshold is selected as less than the threshold for the selected class.

6. The method as claimed in claim 1 wherein the circle that geometrically represents the class has a radius that equals the threshold.

7. A method comprising:
accessing a gallery comprising a plurality of classes geometrically represented as respective circles;
determining distances between classes of the plurality of classes;
accessing a test object;
determining a set of distances of the test object from a set of classes of the gallery;
selecting, from the set of classes, a set of nearest classes from the test object based on the set of distances;
determining thresholds for one or more classes of the gallery for classifying one or more test objects in the one or more classes, wherein the threshold for a class is determined based at least in part on at least one distance of the class from at least one remaining class of the plurality of classes, wherein determining thresholds comprises determining the threshold for the set of nearest classes based on a function of distances between classes of the set of nearest classes, wherein the threshold for one class differs from the threshold for another class, and wherein the circle that geometrically represents the class has a radius based upon the threshold; and
analyzing the test object, wherein analyzing the test object comprises classifying the test object in a respective class in an instance in which the test object satisfies the threshold associated with the respective class and failing to place the test object in any of the one or more classes in an instance in which the test object fails to satisfy the thresholds associated with the one or more classes.

8. The method as claimed in claim 7, further comprising:
selecting a class of the set of nearest classes that is closest to the test object based on the set of distances; and
classifying the test object in the selected class based on a comparison of the determined threshold and a distance between the selected class and the test object.

9. The method as claimed in claim 7, further comprising:
classifying the test object in the selected class, if the distance of the selected class from the test object is less than the determined threshold.

10. An apparatus comprising:
at least one processor; and
at least one memory comprising computer program code, the at least one memory and the computer program code configured to, with the at least one processor, cause the apparatus at least to perform:
accessing a gallery comprising a plurality of classes geometrically represented as respective circles;
determining distances between classes of the plurality of classes;
determining thresholds for one or more classes of the gallery for classifying one or more test objects in the one or more classes, wherein the threshold for a class is determined based at least in part on at least one distance of the class from at least one remaining class of the plurality of classes, wherein the apparatus is further caused to determine the threshold for the class by determining a lowest distance of the at least one distance, and selecting the threshold for the class as substantially equal to half of the lowest distance, wherein the threshold for one class differs from the threshold for another class, and wherein the circle that geometrically represents the class has a radius based upon the threshold; and
analyzing a test object, wherein analyzing the test object comprises classifying the test object in a respective class in an instance in which the test object satisfies the threshold associated with the respective class and failing to place the test object in any of the one or more classes in an instance in which the test object fails to satisfy the thresholds associated with the one or more classes.

11. The apparatus as claimed in claim 10, wherein the apparatus is further caused, at least in part, to, analyze the test object by:
accessing the test object;
determining a set of distances of the test object from a set of classes of the gallery;
selecting a class of the set of classes that is closest to the test object based on the set of distances; and
classifying the test object in the selected class based on a comparison of a threshold for the selected class and a distance between the selected class and the test object.

12. The apparatus as claimed in claim 11, wherein the apparatus is further caused, at least in part, to perform:
classifying the test object in the selected class, if the distance of the selected class from the test object is less than the threshold for the selected class; or
classifying the test object in an untrained class, if the distance of the selected class from the test object is equal or greater than the threshold for the selected class.

13. The apparatus as claimed in claim 11, wherein the apparatus is further caused, at least in part to, perform:
assigning one of a confirmed status and a unconfirmed status to the classification of the test object based on a comparison of the distance between the selected class and the test object and a status threshold.

14. The apparatus as claimed in claim 13, wherein the apparatus is further caused, at least in part to, perform:
assign the confirmed status to the classification of the test object, if the distance between the selected class and the test object is equal or less than the status threshold, wherein the status threshold is selected as less than the threshold for the selected class; or
assign the unconfirmed status to the classification of the test object, if the distance between the selected class and the test object is more than the status threshold, wherein the status threshold is selected as less than the threshold for the selected class.

15. The apparatus as claimed in claim 10 wherein the circle that geometrically represents the class has a radius that equals the threshold.

16. An apparatus comprising:
at least one processor; and
at least one memory comprising computer program code, the at least one memory and the computer program code configured to, with the at least one processor, cause the apparatus, at least in part, to perform:
accessing a gallery comprising a plurality of classes geometrically represented as respective circles;

determining distances between classes of the plurality of classes;

accessing a test object;

determining a set of distances of the test object from a set of classes of the gallery;

selecting, from the set of classes, a set of nearest classes from the test object based on the set of distances;

determining thresholds for one or more classes of the gallery for classifying one or more test objects in the one or more classes, wherein the threshold for a class is determined based at least in part on at least one distance of the class from at least one remaining class of the plurality of classes, wherein the apparatus is further caused to determine thresholds by determining a threshold for the set of nearest classes based on a function of distances between classes of the set of nearest classes, wherein the threshold for one class differs from the threshold for another class, and wherein the circle that geometrically represents the class has a radius based upon the threshold; and analyzing the test object, wherein analyzing the test object comprises classifying the test object in a respective class in an instance in which the test object satisfies the threshold associated with the respective class and failing to place the test object in any of the one or more classes in an instance in which the test object fails to satisfy the thresholds associated with the one or more classes.

17. The apparatus as claimed in claim 16, wherein the apparatus is further caused, at least in part, to perform:

selecting a class of the set of nearest classes that is closest to the test object based on the set of distances; and classifying the test object in the selected class based on a comparison of the determined threshold and a distance between the selected class and the test object.

18. The apparatus as claimed in claim 17, wherein the apparatus is further caused, at least in part, to perform classifying the test object in the selected class, if the distance of the selected class from the test object is less than the determined threshold.

19. A computer program product comprising at least one non-transitory computer-readable storage medium, the computer-readable storage medium comprising a set of instructions, which, when executed by one or more processors, cause an apparatus at least to perform:

accessing a gallery comprising a plurality of classes geometrically represented as respective circles;

determining distances between classes of the plurality of classes;

determining thresholds for one or more classes of the gallery for classifying one or more test objects in the one or more classes, wherein the threshold for a class is determined based at least in part on at least one distance of the class from at least one remaining class of the plurality of classes, wherein the apparatus is further caused, at least in part, to determine the threshold for the class by determining a lowest distance of the at least one distance, and selecting the threshold for the class as substantially equal to half of the lowest distance, wherein the threshold for one class differs from the threshold for another class, and wherein the circle that geometrically represents the class has a radius based upon the threshold; and analyzing a test object, wherein analyzing the test object comprises classifying the test object in a respective class in an instance in which the test object satisfies the threshold associated with the respective class and failing to place the test object in any of the one or more classes in an instance in which the test object fails to satisfy the thresholds associated with the one or more classes.

20. The computer program product as claimed in claim 19 wherein the circle that geometrically represents the class has a radius that equals the threshold.

* * * * *